A. G. CUMMINGS.
Car-Axle Boxes.
No. 154,542. Patented Sept. 1, 1874.
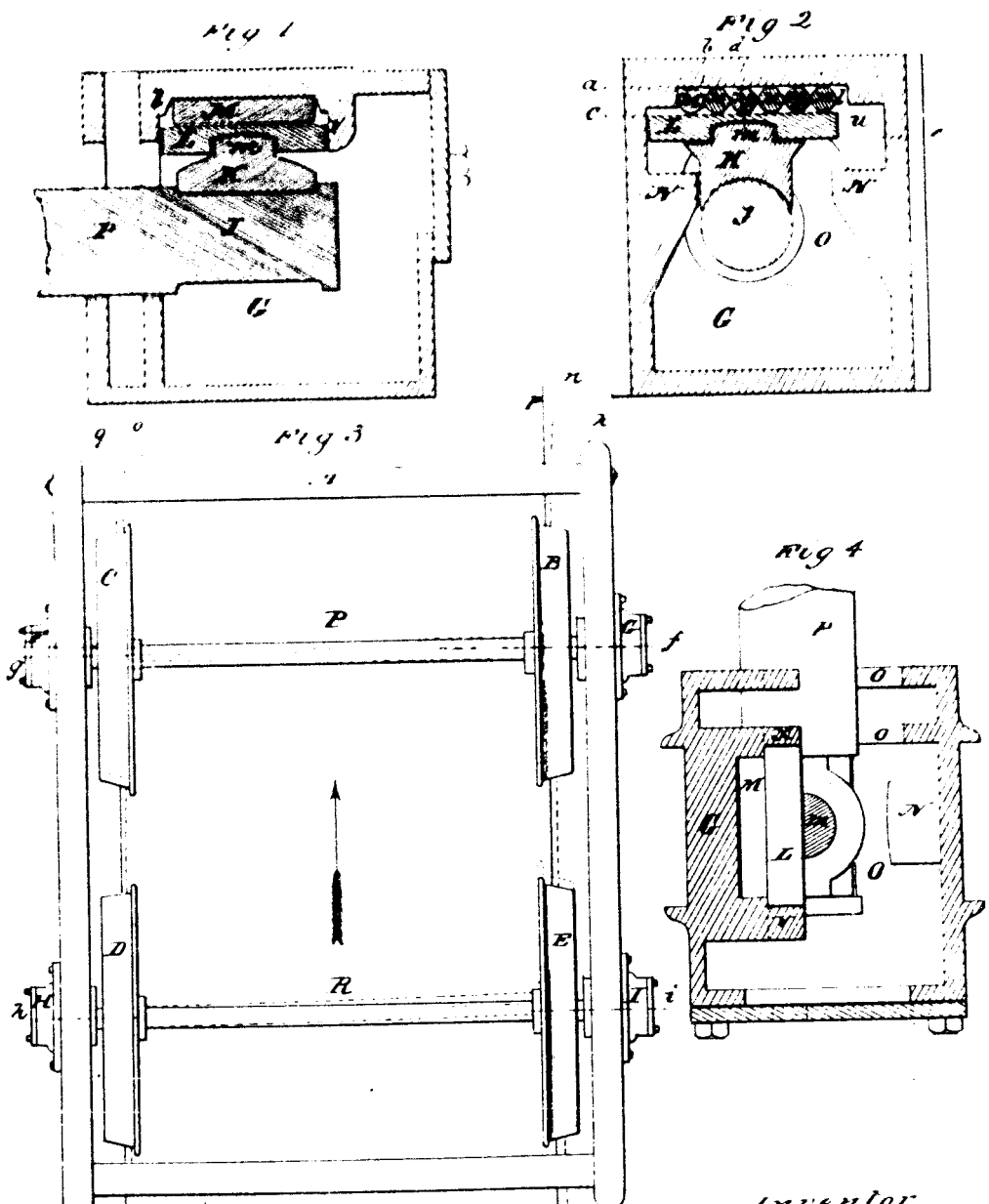
witnesses:
Chas S. Baird
Donald McLean
inventor
Albert G. Cummings

UNITED STATES PATENT OFFICE.

ALBERT G. CUMMINGS, OF CHICAGO, ILLINOIS.

IMPROVEMENT IN CAR-AXLE BOXES.

Specification forming part of Letters Patent No. 154,542, dated September 1, 1874; application filed May 5, 1874.

*To all whom it may concern:*

Be it known that I, ALBERT G. CUMMINGS, of the city of Chicago, county of Cook and State of Illinois, have invented an Improvement in a Combined Journal and Oil Box for Axles for Railway Cars or Trucks, of which the following is a specification:

My invention consists of an arrangement within the oil-box (or it may be in the pedestal holding the oil-box) by which the ends of the axle are allowed to move forward independent of the frame of the car or truck, sufficient to allow the center line of the axle to follow the radial line of a curve by the action of the taper diameter on the tread of the wheels.

Figure 1 is a vertical section of box G and portion of axle P on center line of axle $g$, Fig. 3. Fig. 2 is a transverse section of box G and axle P on line $k$, Fig. 3. Fig. 3 is a plan of frame of car or truck, showing the positions of the axles and wheels when running in the direction indicated by arrow. The full lines are when on a straight track, the dotted lines when on a curve. Fig. 4 is a horizontal section of box G, indicated by lines $a$ to $b$, $b$ to $c$, $c$ to $d$, and $d$ to $e$ in section, Fig. 2.

A is the frame, to which the oil-boxes or pedestals are fast. The lines $q\,p$ indicate the gage and positions of the wheels on the track when running on a straight line. The dotted lines indicate the same when on a curve of a hundred and fifty feet radius. The lines $n\,o$ are a section of curve, showing gage of track. $f$ and $i$ are the radial lines, also center lines of axles. The wheels C E are then in the positions indicated by the dotted lines, the wheels B D being near the pivot $m$ in the boxes G H. (Shown in Figs. 1, 2, and 4.) The movement is not sufficient to be indicated by lines. In running upon a reverse curve, the movement is changed to wheels B D. G is the oil-box; J, the journal of axle; K, the journal-box with pivot $m$ fitting loose in plate L, which carries the weight of the car, and moves into the space $u$ with the box K and axle J in space O by means of friction-rolls M between itself and the chilled surface of recess $l$, box G. The stops N N limit the vibration of axle J, box K, and plate L, and the ends of recess $l$, Fig. 2, and sides of same, Figs. 1 and 4, keep rolls M in the right position, while the flange $v$ and end of box $x$, Figs. 1 and 4, allow the plate to move, but prevent any lateral motion of the frame upon the axle.

I make no claim to the taper diameter of the wheels, as I am aware that they are so constructed at present, and is therefore not new, although I prefer to increase it; also, to give a wider tread and lighter flange to the wheels.

I claim—

The pivot $m$ of the box K, plate L with recess for pivot $m$ and rolls M, flange $v$, chilled recess $l$, stops N N, and spaces O and $u$ within the oil-box G, all combined substantially as and for the purpose set forth.

ALBERT G. CUMMINGS.

Witnesses:
CHARLES BAIRD,
DONALD MCLEAN.